United States Patent [19]

Lawton

[11] 4,113,900
[45] Sep. 12, 1978

[54] CURL-RESISTANT ADHESIVE-COATED PAPER

[76] Inventor: William R. Lawton, 6651 Jewett-Holmwood Rd., Orchard Park, N.Y. 14127

[21] Appl. No.: 769,703

[22] Filed: Feb. 17, 1977

[51] Int. Cl.² .............................................. B05D 5/10
[52] U.S. Cl. ................................. 427/207 R; 428/350; 428/323; 428/327; 260/34.2
[58] Field of Search ........................ 428/350, 323, 327; 427/207 R; 260/34.2

[56] References Cited

U.S. PATENT DOCUMENTS

| | | | |
|---|---|---|---|
| 2,046,492 | 7/1936 | Snyder | 428/350 |
| 2,137,168 | 11/1938 | Levey | 428/350 |
| 2,424,546 | 7/1947 | Bauer et al. | 428/350 |
| 2,477,344 | 7/1949 | Neumann et al. | 427/207 R |
| 2,624,715 | 1/1953 | Wildish | 428/350 |
| 3,104,179 | 9/1963 | Prior | 428/350 |

Primary Examiner—George F. Lesmes
Assistant Examiner—Alexander S. Thomas
Attorney, Agent, or Firm—Kegan, Kegan & Berkman

[57] ABSTRACT

A flat, water-remoistenable, adhesive-coated paper having superior resistance to curling ordinarily accompanying changes in atmospheric humidity. A powdered adhesive is mixed with a solution of triethanolamine plasticizer in toluene and methanol to form a dispersion in which outer surface portions of the adhesive particles are plasticized. When the dispersion is applied to paper and solvent evaporated, the resulting coating comprises a multiplicity of sintered adhesive particles having plasticized outer surface portions joined to one another and to the paper.

8 Claims, 1 Drawing Figure

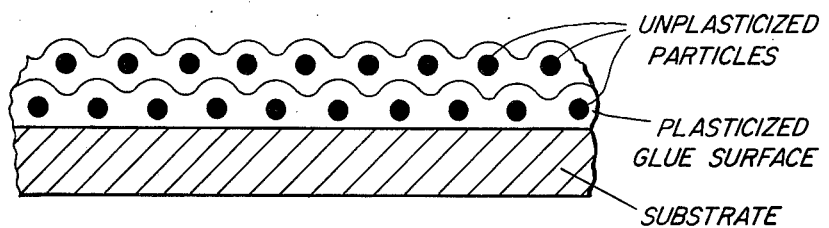

CURL-RESISTANT ADHESIVE-COATED PAPER

BACKGROUND OF THE INVENTION

This invention relates to a water remoistenable adhesive coated product which has minimum curl over a wide range of humidity conditions and takes the form of adhesive tapes or labels.

Water remoistenable adhesive coated papers are well known in the art. They are commonly referred to as gummed labels or tapes. These gummed products are commonly obtained by preparing a solution of a water soluble gum such as animal glue or dextrin, applying a thin film thereof to paper, and evaporating the solvent to give a dry, non-tacky, potentially adhesive material on paper or other substrates.

Practical applications for adhesive coated papers and products manufactured in this manner are limited by the tendency of the gummed sheets or tapes to curl or roll up. Not only does this become a problem in the application of the adhesive product to a desired substrate, but printers cannot properly run these adhesive coated papers in their presses. The curl effect is due to the differing response of the adhesive coating and the paper backing on exposure to changing humidity conditions. Both the paper backing and the adhesive layer expand when they absorb moisture from the atmosphere and contract as they release moisture to the atmosphere. However, the degree of expansion and contraction is generally greater in the adhesive coating than in the paper backing. Thus, when a sheet is exposed to an atmosphere of high moisture content, the adhesive layer will expand more than the paper backing, causing the sheet to curl away from the adhesive side. If the same sheet is exposed to an atmosphere of low moisture content, the adhesive layer will contract more than the paper backing and the sheet will curl towards the adhesive side.

The most important and effective method used by manufacturers in an attempt to overcome the curl problem in producing what the trade refers to as gummed flats is to make the adhesive material in the adhesive coating discontinuous in some manner. Both mechanical and coating formulation approaches have been used with varying degrees of success.

The patent art lists many mechanical approaches for making a flat gummed product. McLaurin, U.S. Pat. No. 890,570 and Gautier, U.S. Pat. No. 2,275,059 roughened the surface of gummed stock by embossing methods. Knappstein, U.S. Pat. No. 1,148,783 ruptured the coating by incised engraving. Holt, U.S. Pat. No. 1,185,600 developed a breaker machine and method for breaking the adhesive coating on gummed paper. McLaurin, U.S. Pat. No. 1,619,027 applied powdered gum to a wet web to give a discontinuous coating. Humphner, U.S. Pat. No. 2,400,995 perforated the paper.

Formulation and coating application techniques have also been used to obtain a discontinuous particle coating effect. Schroder, U.S. Pat. No. 1,297,406 applied glue powder to a solvent tackified size coating. Noble, U.S. Pat. No. 1,361,894 dusted powdered glue or dextrin onto a rubber cement coating. Holt, U.S. Pat. No. 3,090,353 developed a process for electrostatic gumming. The product is obtained by electrostatic deposition of an adhesive onto a thermoplastic binder and the coating is fixed by heat fusion. Solvent dispersions of powdered gums in solutions of resins in organic solvents have been used by Davis, U.S. Pat. No. 2,793,966; Prior, U.S. Pat. No. 3,104,179; Neumann, U.S. Pat. No. 2,477,344 and Russo, U.S. Pat. No. 2,978,343.

One industrial process obtains the adhesive product by dispersion of a water remoistenable gum powder in a toluene solution of a water-sensitive binder such as modified polyvinyl acetate or polyvinyl pyrrolidone.

A second manufacturer electrostatically deposits powdered gum adhesive on a modified polyvinyl acetate coating. The sheet is then heated to soften the binder and allow powdered gum to penetrate into the coating.

A third process obtains gummed flats by coating on a substrate a water-in-oil type emulsion of an aqueous solution of the adhesive gum emulsified in a solvent solution of a modified polyvinyl acetate. On drying, adhesive particles are dispersed in a continuous film of polyvinyl acetate.

Neither the mechanically treated coated adhesive product nor the dispersions of powdered gums in a resin binder give a highly satisfactory flat gummed adhesive. The adhesive coatings which have been mechanically fractured are re-sealed into a continuous film by continued exposure to atmospheric moisture and the curling problem is again evident. With respect to the products obtained from a dispersion of the powdered gum in a resin binder, the binder acts as a diluent and contaminant for the gummed adhesive. The binder coated glue particles require more time for water to penetrate and activate the glue than is required for the unmodified adhesive. The polyvinyl acetate binder reduces the adhesive properties of the adhesive coating and does not stick as well as unmodified adhesive coatings. The coating weight of the adhesive layer must be increased to contain as much effective adhesive as is contained in an unmodified adhesive coating. This results in higher materials costs as well as a reduction in coating production speed.

DESCRIPTION OF THE DRAWING

The FIGURE is a schematic cross-sectional view of an adhesive-coated substrate made in accordance with the invention, showing plasticized surface portions of adhesive particles joined to one another and to the substrate.

BRIEF DESCRIPTION OF THE INVENTION

It has been discovered that the objectionable characteristics observed with flat gummed products prepared by known methods can be overcome by a very simple process of manufacture. A finely ground gummed adhesive is dispersed in an organic solution containing an aliphatic or aromatic hydrocarbon solvent; a material selected from the group consisting of polyfunctional amines, alcohol amines, or polyhydric aliphatic alcohols; and sufficient secondary solvent such as an alcohol to cause the polyols, polyamines, or polyalcohols to form a homogeneous solution with the hydrocarbon solvent. This dispersion, after equilibrium has been reached, is coated onto paper or other suitable substrates by the usual solvent coating methods such as by reverse roll or by wire-wound rod coaters and dried at temperatures ranging from ambient atmospheric temperatures to over 149° C. The resultant product is a sheet with a potentially adhesive coating of fine particles tightly bound to the substrate and also partially bound to one another. This adhesive coated product remains essentially flat when exposed to atmospheric humidity conditions varying from less than 20 percent to essentially 100 percent relative humidity. The activation time for obtaining tack is excellent and the adhesive properties are essentially equivalent to those obtained with the unmodified adhesives applied to the same coating weight.

It is believed that this invention operates in the following manner. During the dispersion of the fine adhesive particles in the mixture of organic solvents, the active ingredient, i.e., the polyalcoholamine, polyamine, or polyhydroxy aliphatic, penetrates the surface of the adhesive particle and this surface is plasticized. Upon coating and drying, the plasticized surfaces come together and are joined into a porous or sintered coating, as shown in the drawing. This coating is characterized by a discontinuous array of unplasticized glue particles dispersed in a continous network of plasticized envelope or outer surface portions of the glue particles.

The size of an unplasticized adhesive particle is dependent on initial particle size, amount of active solvent used, solvent carrier makeup, and drying conditions. These can be varied to give performance characteristics desired from the adhesive.

Adhesive particles useful in this invention can be any of those generally used in water-moistenable adhesives, including animal glue, water soluble dextrins and modified starches and synthetic polymers such as polyvinylalcohol, carboxymethylcellulose, water soluble vinylmethylethermaleic anhydride copolymers, and the like.

The particle size of the adhesive is preferably a size which will pass through screens with mesh in the range of 100 to 300 per inch. Particles coarser than these would be difficult to surface plasticize sufficiently to bond securely in the coating layer and would also provide a coating with undesirable roughness.

The carrier solvent or first liquid can be any aliphatic or aromatic hydrocarbon, some examples of which include petroleum naphthas, benzene, toluene, xylenes, and other aromatics with aliphatic hydrocarbon substituents in the ring such as ethyl or isopropyl benzene, substituted naphthalenes, and the like. Selection of the first liquid is dependent on economics, drying conditions, toxicity, flashpoint, etc.

The co-solvent or second liquid is a non-aqueous solvent which is used to carry the active ingredient into solution. Lower aliphatic alcohols such as methyl, ethyl, and isopropyl alcohols are quite suitable for this purpose. Ketones can also be used if desired. Ratios of methanol to toluene, for example, have been varied from 15/85 to 50/50.

The active materials used to plasticize the surface of the adhesive particles are selected from aliphatic polyols, aliphatic polyamines, and aliphatic alcohol amines which will dissolve or plasticize the adhesive coating particle. Some of the alcohol amines include monoethanolamine, monopropanolamine, diethanolamine, dipropanolamine, ispropanolamine, di-isopropanolamine, triethanolamine, tripropanolamine, tri-isopropanolamine and related compounds. Some of the useful polyols are the ethylene glycols, the propylene glycols, and glycerine. Polyamines include ethylene diamine, diethylenetriamine, triethylene tetramine, and similar compounds. The ratios of active ingredient to adhesive particles have been successfully varied from 5/95 to 40/60. The dispersion has been varied from 30 to 65 percent, based on adhesive particle content. Coatings have been conveniently applied by reverse roll and wire-wound rod standard coating techniques.

The following is an example illustrating the teaching of this invention.

Formula:

Toluene: 540
Methanol: 162
Triethanolamine: 60
Animal Glue (150 mesh): 400

The toluene, methanol, and triethanolamine were placed in a tank and the mixture highly agitated for three hours after addition of the powdered glue.

This coating solution was added to the coating pan and stirred continuously during the coating operations. A 60-inch wide Black-Clawson reverse roll coater was used to apply the coating at a running speed which was varied from 100 to 500 feet per minute and a coating weighing 6 to 8 pounds per 3000 square feet (dry) was applied to a 35-pound bleached sulfite base paper. Drying temperatures in the 50-foot oven were varied from 121° to 204° C. A satisfactory adhesive coated product was obtained during all operating conditions.

Paper from this run was printed both by offset and letterpress without any problems due to curl or dusting of the coated product.

This coated paper was compared with commercial coated papers with coating weights varying from 10 to 12 pounds per 3000 square foot. The curl was measured at relative humidities ranging from 15 to 85 percent at 21° C. The flatness of the paper of this invention was at least equivalent to the commercial products and the quick tack, grab, and permanent adhesion were at least equal and generally superior to commercial papers having 25 percent more adhesive coating than the product of this invention.

Similar results were obtained replacing the ingredients of this example with the adhesive particles, active ingredients and solvents mentioned above.

What is claimed is:

1. A method for adhering a water-remoistenable adhesive to a substrate in the absence of a binding agent, said method comprising the steps of
   (a) dispersing a powdered water-remoistenable adhesive comprising a multiplicity of particles in a liquid solution, said liquid solution comprising
      (1) an organic liquid comprising a mixture of a first liquid selected from the group consisting of aliphatic and aromatic hydrocarbons, and a second liquid selected from the group consisting of ketones and lower aliphatic alcohols, and
      (2) a plasticizer adapted to penetrate outer surface portions of particles of a water-remoistenable adhesive, said plasticizer being selected from the group consisting of polyfunctional amines, alcohol amines, and polyhydric aliphatic alcohols,
   thereby to form a binder-free dispersion of unplasticized adhesive particles having plasticized outer surface portions,
   (b) coating a substrate with said binder-free dispersion, and
   (c) evaporating said organic liquid, thereby forming on said substrate an adhesive coating resistant to curling accompanying changes in atmospheric humidity and comprising a multiplicity of sintered adhesive particles having plasticized outer surface portions joined directly to one another and to said substrate.

2. The method of claim 1, wherein said organic liquid comprises a mixture of toluene and methanol.

3. The method of claim 1, wherein the ratio of plasticizer to adhesive in said dispersion is about 5/95 to about 40/60.

4. The method of claim 3, wherein the ratio of plasticizer to adhesive in said dispersion is about 60/400.

5. The method of claim 1, wherein said plasticizer is a compound selected from the group consisting of monoethanolamine, monopropanolamine, diethanolamine, dipropanolamine, isopropanolamine, diisopropanolamine, triethanolamine, tripropanolamine, and triisopropanolamine.

6. The method of claim 1, wherein said plasticizer is a compound selected from the group consisting of ethylene glycols, propylene glycols, and glycerine.

7. The method of claim 1, wherein said plasticizer is a compound selected from the group consisting of ethylene diamine, diethylene-triamine, and triethylene tetramine.

8. The method of claim 1, wherein said plasticizer is triethanolamine.

* * * * *